United States Patent [19]

Nuber et al.

[11] Patent Number: 4,786,699

[45] Date of Patent: Nov. 22, 1988

[54] PREPARATION OF POLYVINYLPYRROLIDONE

[75] Inventors: Adolf Nuber, Boehl-Iggelheim; Siegfried Lang, Ludwigshafen; Axel Sanner, Frankenthal; Gerd Schroeder, Limburgerhof, all of Fed. Rep. of Germany

[73] Assignee: BASF Aktiengesellschaft, Fed. Rep. of Germany

[21] Appl. No.: 144,744

[22] Filed: Jan. 19, 1988

Related U.S. Application Data

[63] Continuation of Ser. No. 901,584, Aug. 29, 1986, abandoned.

[30] Foreign Application Priority Data

Sep. 13, 1985 [DE] Fed. Rep. of Germany ....... 3532747

[51] Int. Cl.$^4$ ............................................. C08F 20/44
[52] U.S. Cl. ..................................... 526/229; 526/264
[58] Field of Search ................................ 526/229, 264

[56] References Cited

U.S. PATENT DOCUMENTS 2,634,259 4/1953 Ney, Jr. et al. ...................... 526/264
3,129,210 4/1964 Grosser et al. ...................... 526/264

Primary Examiner—Joseph L. Schofer
Assistant Examiner—Peter D. Mulcahy
Attorney, Agent, or Firm—Keil & Weinkauf

[57] ABSTRACT

Polyvinylpyrrolidone having a Fikentscher K value of from 14 to 95 is prepared at from 50° to 95° C. in aqueous solution with hydrogen peroxide as starter, the solution being maintained at pH 7–11 by means of NaOH, KOH, their carbonates or bicarbonates.

3 Claims, No Drawings

PREPARATION OF POLYVINYLPYRROLIDONE

This application is a continuation of application Ser. No. 901,584, filed on Aug. 29, 1986, now abandoned.

The present invention relates to a process for preparing polyvinylpyrrolidone (PVP) in aqueous solution with hydrogen peroxide as starter, wherein a drop in pH to below 7 is avoided, not in the customary manner with ammonia, but with NaOH, KOH, their carbonates or bicarbonates.

In the course of the polymerization of N-vinylpyrrolidone (VP) with $H_2O_2$ as starter, the pH is known to decrease gradually. This must be prevented, since VP undergoes hydrolysis in the acid pH range. It is therefore customary to add ammonia during the polymerization (cf. for example DE No. 922,378). However, this gives rise to undesirable hydrazine. It is true that the formation of hydrazine is suppressed when ammonia is replaced by a tertiary amine, but the polymerization is slowed down (loc. cit. page 2, Table 1) and the polymer solution discolors. Other (primary and secondary) amines give rise to similar problems. The presence of NaOH or $Na_2CO_3$ has been reported to give rise to problems with starting the polymerization (loc. cit. page 2, lines 85 to 87, and Table 1).

It is an object of the present invention to develop a process for preparing PVP, wherein no hydrazine is formed and the polymer produced is of the same or better quality than that produced in the conventional process in the presence of ammonia.

We have found that this object is achieved by a process for preparing polyvinylpyrrolidone having a Fikentscher K value of from 14 to 95 at from 50° to 95° C. in aqueous solution with hydrogen peroxide as starter, wherein the solution is maintained at pH 7-11 by means of NaOH, KOH, their carbonates or bicarbonates.

The K value is a measure of the molecular weight (H. Fikentscher, Cellulose-Chemie 13 (1932), 58-64 and 71-74).

To speed up the decomposition of the $H_2O_2$, the reaction solution advantageously contains from 1 to 2000, preferably from 3 to 200, ppb of a heavy metal customary for this purpose, preferably copper, iron, silver or cobalt, in the free, ie. noncomplexed, form.

To reliably establish the heavy metal ion concentration, it is advisable to add an excess of heavy metal salt and a complexing agent. The amounts used for this purpose are from 20 ppb to 20 ppm, preferably from 50 ppb to 5 ppm, based on VP, of a heavy metal and from 0.5 to 1000 ppm, preferably from 1 to 500 ppm, based on VP, of a complexing agent. Suitable complexing agents are in particular phosphates, for example tetrasodium diphosphate, polyphosphates and metaphosphates, but also other complexing agents such as nitrilotriacetic acid, ethylenediaminetetra-acetic acid, bis(2-aminoethyl)aminopentaacetic acid and acrylic acid polymers.

To effect polymerization, the monomeric VP can be presented in from 10 to 60, preferably from 20 to 50, % strength aqueous solution, with or without from 0.05 to 4, preferably from 0.1 to 3, % by weight, based on VP, of $H_2O_2$ and be heated up to from 50° to 95° C., preferably 65° to 85° C.; but it is also possible and preferable first to heat up the monomer solution and then to add the $H_2O_2$. The heavy metal salt is advantageously not added until the polymerization temperature is reached, as well as, if used, the complexing agent. The solution is stirred, and the pH is monitored continuously, for example by means of a pH electrode, and is kept as constant as possible (±0.1) within the range from 7 to 11, preferably from 7 to 9.5, by the dropwise addition of one or more of the alkalis mentioned. A protective gas atmosphere is not absolutely necessary.

Depending on the desired residual monomer content, on ceasing of the main reaction (distinct drop in consumption of base) further $H_2O_2$, preferably from 0.1 to 1.0 by weight, based on VP, can be added after some time (from 1 to 6 hours), if desired in multiple portions at intervals of from about 0.5 to 2 hours, and after the last portion the reaction temperature is maintained for a further 1 to 3 hours. The total polymerization time is within the range from 3 to 20 hours. The residual monomer content can be determined by means of the iodine number, for example by the method of USP XXI (1985), 823.

If no sodium or potassium ions are wanted in the product, they can be removed from the polymer solution, for example by means of an acid ion exchanger. Whether this is done by passing the polymer solution through a stationary exchanger or by leaving a finely particulate ion exchanger in contact with the solution for some time before separating off the former is immaterial.

The K value of the polymer can be set via the amount of starter, the temperature and the pH (the higher the pH, the higher the K).

The polymer obtained is equivalent to the polymer obtainable by the customary process in the presence of ammonia in every respect (for example molecular weight distribution, residual monomer content, the presence of other impurities, color, stability), but contains no hydrazine.

The hydrazine content can be determined for example by the method of the Pharmacopeial Forum of the US Pharmacopeial Convention, Inc., Rochville, Md., Mar.-Apr. 1985, 218.

In the Examples below, the K value was always measured at 25° C. in a two percent strength aqueous solution.

EXAMPLE 1

650 parts of vinylpyrrolidone and 1200 parts of water are heated to 82° C., 0.65 part of 0.01% strength copper-(II) chloride solution, 0.65 part of 0.1% strength sodium pyrophosphate solution and 19.5 parts of 30% strength hydrogen peroxide are added, and the mixture is polymerized at 82° C. for a total of 5 hours. 2 and 3 hours after the start a further 6.5 parts of 30% strength hydrogen peroxide are added each time. To maintain a pH of 7.7 during the polymerization, 5% strength potassium hydroxide solution is metered in. The polymer solution is spray-dried. The polymer obtained has a K value of 25.5; the residual monomer content is less than 0.2% (based on solid product).

EXAMPLE 2

400 parts of vinylpyrrolidone are dissolved in 1200 parts of water, 2 parts of 0.01% strength iron(III) chloride solution and 13 parts of 30% strength hydrogen peroxide are added, and the mixture is polymerized at 83° C. for 6 hours. To maintain a pH of 7.7 during the polymerization, 33 parts by volume of 5% strength sodium hydroxide solution are metered in. The polymer solution has a K value of 24.9; the residual monomer content is less than 0.3% (based on solids content).

EXAMPLE 3

550 parts of vinylpyrrolidone and 1283 parts of water are heated to 77° C. 1.65 Parts of 0.01% strength copper(II) chloride solution, 1.65 parts of 1% strength sodium hexametaphosphate solution and 18 parts of 30% strength hydrogen peroxide are then added and the mixture is polymerized at 77° C. for a total of 12 hours. To maintain a pH of 7.7, 5% strength sodium hydroxide solution is metered in. After 5 hours a further 9 parts of 30% strength hydrogen peroxide are added. The polymer solution thus obtained has a K value of 24.9; the residual monomer content is less than 0.1% (based on solids content).

EXAMPLE 4

475 parts of vinylpyrrolidone are dissolved in 1425 parts of water, and the solution is heated to 70° C. 3 Parts of 0.01% strength copper(II) chloride solution, 3 parts of 1% strength sodium pyrophosphate and 11 parts of 30% strength hydrogen peroxide are then added and the mixture is polymerized at 70° C. for a total of 6.5 hours, during which the pH is brought to 9.2 by adding 41 parts of 5% strength sodium hydroxide solution. After 4.5 hours a further 3 parts of 30% strength hydrogen peroxide are added. Spray-drying gives a polymer having a K value of 33.1 and a residual monomer content of less than 0.1% (based on solid product).

EXAMPLE 5

550 parts of vinylpyrrolidone are dissolved in 1300 parts of water, and the solution is heated to 75° C. 1.1 Parts of 0.01% strength cobalt(II) chloride solution, 1.1 parts of 1% strength tetrasodium diphosphate solution and 13 parts of 30% strength hydrogen peroxide are then added and the mixture is polymerized at 75° C. for 7 hours. After 4 hours a further 5.5 parts of 30% strength hydrogen peroxide are added. By adding 5% strength sodium hydroxide solution the pH is adjusted during the polymeri-zation to 7.8. The polymer solution has a K value of 28.7; the residual monomer content is less than 0.2% (based on solid product).

EXAMPLE 6

600 parts of vinylpyrrolidone are dissolved in 1400 parts of water, and the solution is heated to 70° C. 0.6 Part of 0.001% strength copper(II) chloride solution and 2 parts of 30% strength hydrogen peroxide are then added and the mixture is polymerized at 70° C. for 12 hours, during which the pH is brought to 8.2 by adding 30 parts of 5% strength sodium hydroxide solution. After 4 and 6 hours a further 2 parts of 30% strength hydrogen peroxide are added each time. The polymer solution has a K value of 56.4.

EXAMPLE 7

300 parts of vinylpyrrolidone are dissolved in 900 parts of water, and the solution is heated to 70° C. 0.3 Part of 0.01% strength copper(II) chloride solution, 0.8 part of 1% strength sodium pyrophosphate solution and 20 parts of 30% strength hydrogen peroxide are added and is the mixture poLymerized at 70° C. for 8 hours. After 3 hours and 5 hours 5 parts of 30% strength hydrogen peroxide are added each time. To maintain a pH of 7.2 during the polymerization, 20 parts of 25% strength sodium carbonate solution are metered in. The polymer solution is freezedried. The polymer obtained has a K value of 20.5.

EXAMPLE 8

350 parts of vinylpyrrolidone are dissolved in 1370 parts of water, and the solution is heated to 70° C. 14 Parts of 0.01% strength copper(II) chloride solution, 14 parts of 1% strength tetrasodium diphosphate solution and 5 parts of 30% strength hydrogen peroxide are added and the mixture is polymerized at 70° C. for a total of 10 hours. After 3.5 and 7 hours 5 parts of 30% strength hydrogen peroxide are added each time. To maintain a pH of 7.3 during the polymerization, 5% strength sodium hydroxide solution is metered in. The polymer solution has a K value of 34.8; the residual monomer content is less than 0.2%.

We claim:

1. A process for preparing polyvinylpyrrolidone having a Fikentscher K value of from 14 to 95 which comprises: heating an aqueous solution of vinylpyrrolidone at a temperature of 50° to 95° C. in the presence of hydrogen peroxide as a starter and in the presence of free heavy metal ions in a concentration range of from 1 ppb to 2 ppm, based on the vinylpyrrolidone, with said heavy metal being selected from the group consisting of copper, iron, silver and cobalt, and maintaing the pH of the solution at from 7–11 by the addition of NaOH, KOH, their carbonated or bicarbonates.

2. The process of claim 1, wherein from 20 ppb to 20 ppm of a heavy metal salt selected from the group consisting of copper, iron, silver and cobalt salts and from 0.5 to 1000 ppm, each based on vinylpyrrolidone, of a heavy metal complexing agent are present in the solution.

3. The process of claim 1, wherein the solution temperature is maintained at from 65° to 85° C. and wherein the pH of the solution is maintained at from 7 to 9.5 by adding NaOH or KOH dropwise to the solution.

* * * * *